(12) United States Patent
Williams

(10) Patent No.: US 10,085,440 B1
(45) Date of Patent: Oct. 2, 2018

(54) ADJUSTABLE TURKEY CALL STRIKER

(71) Applicant: R. Keith Williams, El Dorado, AR (US)

(72) Inventor: R. Keith Williams, El Dorado, AR (US)

( * ) Notice: Subject to any disclaimer, the term of this patent is extended or adjusted under 35 U.S.C. 154(b) by 153 days.

(21) Appl. No.: 14/451,041

(22) Filed: Aug. 4, 2014

Related U.S. Application Data

(60) Provisional application No. 61/958,696, filed on Aug. 5, 2013.

(51) Int. Cl.
*A01M 31/00* (2006.01)

(52) U.S. Cl.
CPC .................. *A01M 31/004* (2013.01)

(58) Field of Classification Search
CPC ............... F16B 35/005; F16B 35/06
USPC .................................... 446/397, 418
See application file for complete search history.

(56) References Cited

U.S. PATENT DOCUMENTS

| | | | | |
|---|---|---|---|---|
| 3,742,602 A * | 7/1973 | Brumwell | ................. | 30/340 |
| 3,872,572 A * | 3/1975 | Hahn | ..................... | 29/432.1 |
| 4,105,346 A * | 8/1978 | Gelinas | .................. | 403/104 |
| 4,926,522 A * | 5/1990 | Wang | ..................... | 16/427 |
| 5,224,900 A * | 7/1993 | Hai | ........................ | 470/185 |
| 5,716,254 A * | 2/1998 | Bowes | ................. | G10K 3/00 446/397 |
| 5,961,367 A * | 10/1999 | Morris | ................. | 446/397 |
| 6,039,627 A * | 3/2000 | Forbes et al. | ................. | 446/208 |
| 6,053,794 A * | 4/2000 | Weiser | ................. | 446/207 |
| 6,085,850 A * | 7/2000 | Phillips | ................. | 173/203 |
| 6,106,357 A * | 8/2000 | Weiser | ................. | 446/207 |
| 6,210,252 B1 * | 4/2001 | Anderson | ................. | 446/418 |
| 6,669,529 B1 * | 12/2003 | Scaries | ................. | 446/397 |
| 6,751,875 B2 * | 6/2004 | Jones | ................. | 30/392 |
| 6,811,132 B1 * | 11/2004 | Ferdinand | ................. | F16C 11/10 116/173 |
| 7,761,949 B1 * | 7/2010 | Hughes, IV | ................. | 15/172 |
| 8,056,242 B2 * | 11/2011 | Chen | ................. | 30/342 |
| 8,566,999 B1 * | 10/2013 | Casey | ................. | 15/146 |
| 2005/0049622 A1 * | 3/2005 | Mittelstaeot | ................. | 606/167 |
| 2009/0056407 A1 * | 3/2009 | Greene | ................. | 72/481.1 |
| 2010/0269263 A1 * | 10/2010 | Burch et al. | ................. | 7/108 |
| 2011/0201248 A1 * | 8/2011 | Bean | ................. | 446/418 |
| 2012/0045963 A1 * | 2/2012 | Moss | ................. | 446/418 |

* cited by examiner

Primary Examiner — John E Simms, Jr.
Assistant Examiner — Urszula M Cegielnik
(74) *Attorney, Agent, or Firm* — R. Keith Harrison

(57) ABSTRACT

A turkey call striker that may be adjusted by a hunter to change the length of the striker, and thus the pitch of the sound produced by the call, is provided. The striker is comprised of a handle, peg, thumbscrew, and threaded aperture. The peg is inserted into a bore through the center of the handle until it reaches the desired position, at which time the hunter inserts the thumbscrew into the threaded aperture to secure the peg to the handle. An added benefit of the adjustable turkey call striker is that is collapses to a small size for easy carry in the field.

10 Claims, 2 Drawing Sheets

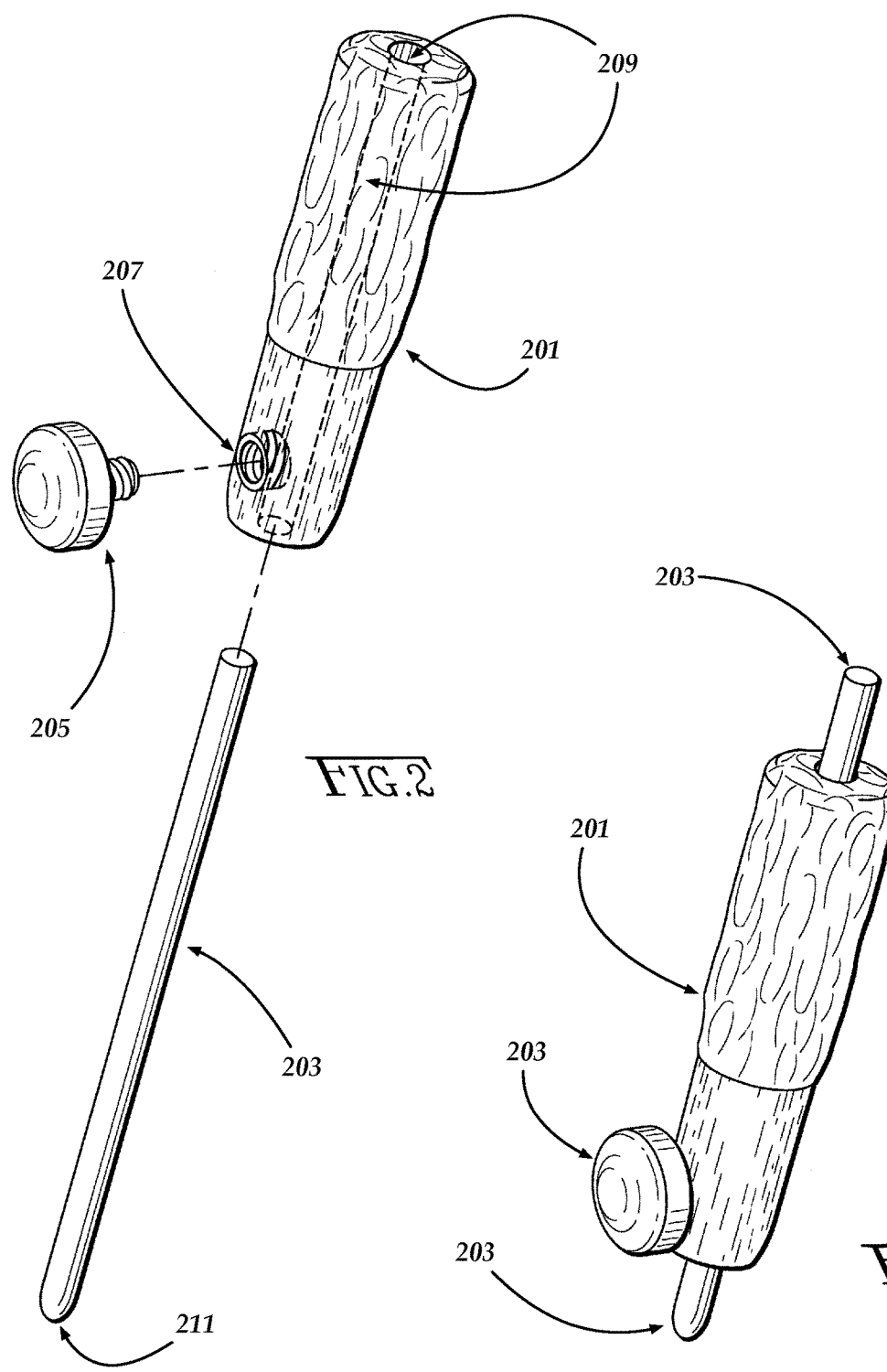

ADJUSTABLE TURKEY CALL STRIKER

CROSS REFERENCES

This application claims priority to U.S. Provisional Application No. 61/958,696, filed Aug. 5, 2013.

GOVERNMENTAL RIGHTS

None.

BACKGROUND OF THE INVENTION

The present invention relates to turkey calls, and more particularly an adjustable striker for a pot-type turkey call capable of providing multiple different pitches of turkey call.

Turkeys are wild animals that are hunted for both sport and sustenance. A typical method of hunting turkeys involves using a call to attract male turkeys to the hunter's location. One type of call is a pot call, which is used with a striker. Pot calls are traditionally made of a wood ring affixed to a solid slate sounding board and a wood resonator. An example of a pot call is U.S. Ser. No. 14/046,192, filed by the inventor on Oct. 4, 2013. The striker is scratched across the sounding board to produce sound. A multitude of different turkey calls can be imitated with this type of call, including yelps, clucks, cackles, cutting, and purring may be executed with a pot call.

One disadvantage to turkey calls of the prior art is that they typically sound like a sole animal. Like humans, turkeys have different vocal characteristics depending on age and gender. Juvenile females usually have clear, high-pitched voices, while mature females have deeper and raspier voices. Juvenile males have higher pitched voices that crack, while mature males have deep, coarse voices. Different types of strikers and pot call combinations carry different vocal characteristics. It is an object of the invention to provide an adjustable turkey call striker that allows the hunter to carry a single pot-type call to create a range of different vocal characteristics.

Typical turkey call strikers of the prior art were constructed as a solid piece of wood or other material. The length and thickness of the striker affect the tone produced when it is scratched across the surface of a pot call. A hunter carrying prior art call strikers must carry several strikers to reproduce the vocal characteristics of multiple birds. It is an object of the invention to provide an adjustable turkey call striker that obviates the need to carry multiple strikers.

Turkey call strikers of the prior art are typically several inches or more in length, which make them difficult to carry in normal-sized pockets. It is an object of the present invention to provide an adjustable turkey call striker capable of being collapsed into a compact size for easy carry.

The apparatus in accordance with the present invention provides an adjustable turkey call striker that obviates the need to carry multiple strikers by along the hunter to create a range of different turkey vocals with a single pot call.

BRIEF SUMMARY OF THE INVENTION

The turkey call striker provided by the present invention comprises a striker formed from a handle, a peg, a thumbscrew, and a threaded aperture. The peg may be preferably positioned in the bore such that the length of the striker is adjustable. The striker's adjustability means the striker has the added benefit of being collapsible for ease of carry.

These and other advantages provided by the invention will become apparent from the following detailed description which, when viewed in light of the accompanying drawings, disclose the embodiments of the invention.

BRIEF DESCRIPTION OF THE DRAWINGS

FIG. 2 is an exploded, perspective view of the turkey call striker.

FIG. 3 is a perspective view showing a preferential configuration of the turkey call striker.

LISTING OF COMPONENTS

Figure 1:
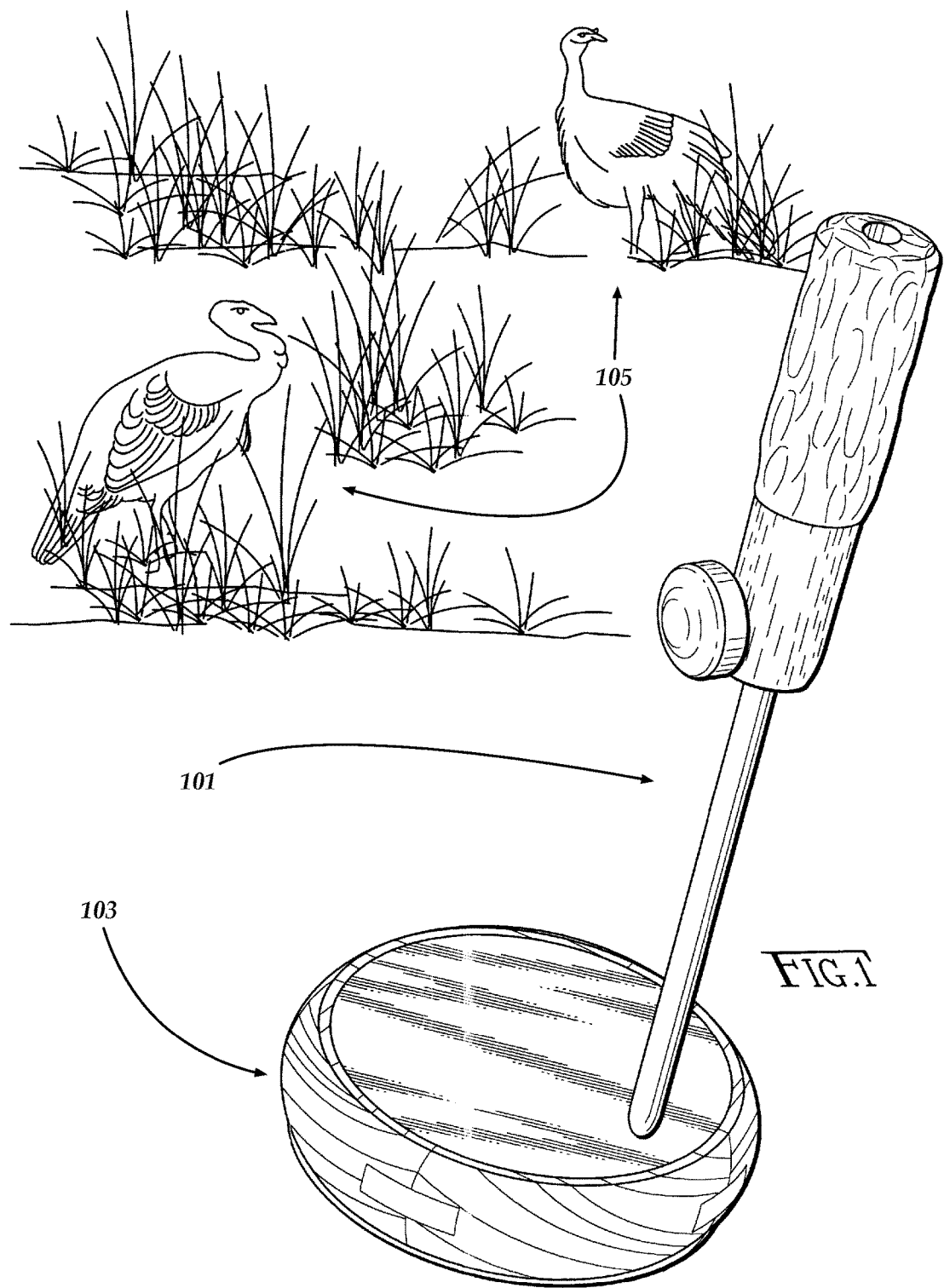
FIG. 1 is a perspective view of the turkey call striker, as shown in use with a pot-type call in the natural habitat of turkeys.

101—striker
103—pot call
105—turkeys
201—handle
203—peg
205—thumbscrew
207—threaded aperture
209—bore
211—point

DETAILED DESCRIPTION OF THE INVENTION

The invention as disclosed herein provides a turkey call striker which may be adjusted by a hunter to change the length of the striker, which in turn changes the pitch of the sound produced by the call.

As shown in FIG. 1, a turkey call striker, or striker, 101 is scratched across the surface of a pot call 103 in order to create sounds that imitate turkey vocals, which hopefully will attract turkeys 105 to the hunter's position.

Turning now to FIG. 2, striker 101 is comprised of a handle 201, peg 203, thumbscrew 205, and threaded aperture 207. Handle 201 preferentially has a longitudinal axis and a transverse axis. Handle 201 has a bore 209 through the medial portion of the longitudinal axis of handle 201. Peg 203 preferentially has a mostly cylindrical shape, with the diameter of the cylinder preferably being slightly smaller than bore 209. Ideally, peg 203 snugly fits within bore 209 so as to create a solid connection along the longitudinal length of peg 203 and bore 209.

The hunter inserts peg 203 into bore 209 until the striker reaches the desired length. A longer striker will create a deeper sound. Once the desired length is reached, the hunter inserts thumbscrew 205 into threaded aperture 207 until thumbscrew 205 exerts clamping force on peg 203. Thumbscrew 205 is tightened so that peg 203 snugly abuts and cannot move with respect to handle 201. Thumbscrew 205 is preferably operable by hand, but persons having skill in the art will recognize that other screw types requiring tools to operate will perform a similar function.

Threaded aperture 207 may be an aperture drilled into handle 201, or threaded aperture 207 may be constructed of a metal fitting such as brass, steel, or aluminum or other hard material and press fit, glued, or otherwise affixed inside an aperture drilled into handle 201. Preferably, threaded aperture 207 is comprised of a coarse threaded self-tapping insert, such as the TRISERT brand insert sold by Yardley Products Corp. of Yardley, Pa.

The end of peg 203 distal to handle 201 is preferentially sharpened into a point 211. Optionally, peg 203 may be sharpened on both ends, with each end having a different shape to point 211. A rounder point 211 will create more surface area on the call, and thus a raspier or coarser sound, while a sharper point 211 will create less surface area on the call, and thus a clearer sound. Handle 201 and peg 203 may be created out of a variety of different materials, including but not limited to wood, ceramic, carbon, plastic, aluminum.

Turning now to FIG. 3, the hunter may insert peg 203 into bore 209 such that peg 203 extends from bore 209 at both longitudinal ends of handle 201; a shorter peg 203 may be inserted completely inside bore 209. When thumbscrew 205 is tightened, such configurations render striker 101 compact and easy to carry.

While the inventors have described above what they believe to be the preferred embodiments of the invention, persons having ordinary skill in the art will recognize that other and additional changes may be made in conformance with the spirit of the invention and the inventors intend to claim all such changes as may fall within the scope of the invention.

I claim:

1. An adjustable turkey call striker, comprising:
    A handle, further comprising a longitudinal axis and a transverse axis, wherein the longitudinal axis of the handle has a bore through a medial portion of the longitudinal axis;
    a peg comprising a longitudinal axis, the peg snugly fits within the bore in a sliding manner so as to create a solid connection along a longitudinal length of the peg and the bore;
    a thumbscrew;
    a threaded aperture along the transverse axis of the handle;
    wherein the peg is capable of being inserted into the bore to a predetermined length, and
    the thumbscrew is capable of being inserted into the threaded aperture and tightened until the thumbscrew exerts clamping force on the peg such that the peg snugly abuts and is substantially immovable with respect to the handle.

2. The adjustable turkey call striker of claim 1, wherein the peg further comprises longitudinal ends proximal and distal to the handle, and wherein the peg has a point at the longitudinal end of the peg distal to the handle.

3. The adjustable turkey call striker of claim 1, wherein the peg further comprises a point at both longitudinal ends of the peg.

4. The adjustable turkey call striker of claim 1, wherein the threaded aperture further comprises a fitting inserted into an aperture drilled into the handle.

5. The adjustable turkey call striker of claim 1, wherein the threaded aperture further comprises a self-tapping threaded insert that is inserted into an aperture drilled into the handle.

6. An adjustable turkey call striker and pot call, comprising:
    A handle, further comprising a longitudinal axis and a transverse axis, wherein the longitudinal axis of the handle has a bore through a medial portion of the longitudinal axis;
    a peg comprising a longitudinal axis, the peg snugly fits within the bore so as to create a solid connection along a longitudinal length of the peg and the bore;
    a thumbscrew;
    a threaded aperture along the transverse axis of the handle and perpendicular to the longitudinal axis of the handle;
    wherein the peg is capable of being inserted into the bore to a predetermined length, and
    the thumbscrew is capable of being inserted into the threaded aperture and tightened until the thumbscrew exerts clamping force on the peg and the peg snugly abuts and is substantially immovable with respect to the handle; and
    a pot call, the peg of the striker capable of being scratched across a surface of the pot call to create sounds imitating turkey vocals.

7. The adjustable turkey call striker and pot call of claim 6, wherein the peg further comprises longitudinal ends proximal and distal to the handle, and wherein the peg has a point at the longitudinal end of the peg distal to the handle.

8. The adjustable turkey call striker and pot call of claim 6, wherein the peg further comprises a point at both longitudinal ends of the peg.

9. The adjustable turkey call striker and pot call of claim 6, wherein the threaded aperture further comprises a fitting inserted into an aperture drilled into the handle.

10. The adjustable turkey call striker and pot call of claim 6, wherein the threaded aperture further comprises a self-tapping threaded insert that is inserted into an aperture drilled into the handle.

* * * * *